(12) United States Patent
Diao et al.

(10) Patent No.: US 12,426,113 B2
(45) Date of Patent: Sep. 23, 2025

(54) SIGNALING EXCHANGE SCHEMES IN WIRELESS COMMUNICATIONS

(71) Applicant: ZTE Corporation, Guangdong (CN)

(72) Inventors: Xueying Diao, Shenzhen (CN); Lin Chen, Shenzhen (CN); Ying Huang, Shenzhen (CN)

(73) Assignee: ZTE Corporation, Guangdong (CN)

( * ) Notice: Subject to any disclaimer, the term of this patent is extended or adjusted under 35 U.S.C. 154(b) by 423 days.

(21) Appl. No.: 18/169,422

(22) Filed: Feb. 15, 2023

(65) Prior Publication Data

US 2023/0199885 A1    Jun. 22, 2023

Related U.S. Application Data

(63) Continuation of application No. PCT/CN2020/122686, filed on Oct. 22, 2020.

(51) Int. Cl.
*H04W 76/15* (2018.01)

(52) U.S. Cl.
CPC ................. *H04W 76/15* (2018.02)

(58) Field of Classification Search
CPC ..... H04W 76/15; H04W 36/08; H04W 36/00; H04W 36/0061; H04W 36/0077; H04W 36/087; H04W 36/38; H04W 40/02; H04W 40/22; H04W 40/248; H04W 40/36; H04W 88/085; H04W 84/047; H04W 88/08; H04W 92/24; H04L 61/5014; H04L 45/74; H04L 61/5061
See application file for complete search history.

(56) References Cited

U.S. PATENT DOCUMENTS

| | | | | |
|---|---|---|---|---|
| 2020/0351854 A1* | 11/2020 | Wang | ................ | H04W 76/12 |
| 2022/0286841 A1* | 9/2022 | Mildh | ................ | H04W 8/26 |
| 2022/0361072 A1* | 11/2022 | Zhu | ................ | H04W 36/0061 |
| 2023/0328625 A1* | 10/2023 | Xu | ................ | H04W 36/08 |

FOREIGN PATENT DOCUMENTS

| | | |
|---|---|---|
| CN | 111526544 A | 8/2020 |
| WO | 2020/088472 A1 | 5/2020 |
| WO | 2020/090987 | 5/2020 |
| WO | 2020/149653 | 7/2020 |
| WO | 2020/159291 | 8/2020 |
| WO | 2020/199845 A1 | 10/2020 |
| WO | 2022082560 A1 | 4/2022 |

OTHER PUBLICATIONS

WO 2021/147107 A1 (Year: 2021).*

(Continued)

*Primary Examiner* — Rushil P. Sampat
(74) *Attorney, Agent, or Firm* — Perkins Coie LLP

(57) ABSTRACT

A method of wireless communication is described. The method includes sending, from a first central unit (CU) configured to communicate with an integrated access and backhaul (IAB) node, to a second CU, a first message; and receiving, by the first CU, a second message that includes configuration information, wherein the first message includes at least one of an identification of the IAB node, an identification of a user device in communication with the IAB node.

18 Claims, 6 Drawing Sheets

(56) References Cited

OTHER PUBLICATIONS

EPO, Extended European Search Report for European Application No. 20958143.8, mailed on Sep. 15, 2023, 12 pages.
Huawei, "Routing in IAB network," 3GPP TSG RAN WG3 #106, Reno, USA, R3-196992, Nov. 18-22, 2019, 8 pages.
Nokia, "Summary of Offline Discussion on CB: # 8 Topology Redundancy," 3GPP TSG RAN WG3 #108-e, Online, R3-205468, Jun. 1-11, 2020, 18 pages.
Huawei, "Remaining issues for routing," 3GPP TSG RAN WG2, Reno, USA, R2-1915456, Nov. 18-22, 2019, 9 pages.
OA, Official Action from for Japanese Application No. 2023-512679, mailed Feb. 8, 2024, (9 pages).
Nokia et al. "Discussion on Inter-CU Topology Redundancy," 3GPP TSG-RAN WG3 Meeting #109-e R3-205265 Aug. 17-28, 2020 (4 pages).
Samsung, "13.2.2 (Reduction of Service Interruption) Reduction in IAB," 3GPP TSG RAN WG3 #109-e R3-205412, Internet<URL:https://www.3gpp.org/ftp/tsg_ran/WG3_lu/TSGR3_109-e/Docs/R3-205412.zip>, Aug. 7, 2020.
ZTE, Sanechips, "Discussion on inter-donor IAB-node migration procedure," 3GPP TSG RAN WG3 #109-e R3-205162, Internet<URL:https://www.3gpp.org/ftp/tsg_ran/WG3_lu/TSGR3_109-e/Docs/R3-205162.zip>, Aug. 7, 2020.
EPO, Communication pursuant to Article 94(3) EPC for European Application No. 20 958 143.8, mailed on Mar. 12, 2025, 4 pages.
CNIPA, First Office Action for Chinese Application No. 202080105887.4, mailed on Dec. 30, 2024, 30 pages with unofficial English translation.
Qualcomm Incorporated, "Inter-donor IAB-node Migration," 3GPP TSG-RAN WG3 #109-e, E-meeting, R3-204795, Aug. 17-28, 2020, 5 pages.
CATT, "Group Handover in Inter IAB donor-CU," 3GPP TSG-RAN3 #109-e, E-meeting, R3-204733, Aug. 17-28, 2020, 5 pages.
ISA, International Search Report for International Application No. PCT/CN2020/122686, Mail Date: Jul. 14, 2021. 9 pages.
Nokia et al. "Discussion on Inter-CU Topology Redundancy," 3GPP TSG-RAN WG3 Meeting #109-e R3-205265, Aug. 28, 2020 (4 pages).
Nokia et al. "Inter-Donor Topology Adaptation," 3GPP TSG-RAN WG3 Meeting #111 Electronic E-meeting R2-2007488, Aug. 28, 2020 (4 pages).
CNIPA, Second Office Action for Chinese Application No. 202080105887.4, mailed on Jul. 8, 2025, 6 pages with unofficial English translation.

\* cited by examiner

SIGNALING EXCHANGE SCHEMES IN WIRELESS COMMUNICATIONS

CROSS REFERENCE TO RELATED APPLICATIONS

This patent document is a continuation of and claims benefit of priority to International Patent Application No. PCT/CN2020/122686, filed on Oct. 22, 2020. The entire content of the before-mentioned patent application is incorporated by reference as part of the disclosure of this application.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for signaling exchange schemes in wireless communications.

In one aspect, a wireless communication method is disclosed. The wireless communication method includes sending, from a first central unit (CU) configured to communicate with an integrated access and backhaul (IAB) node, to a second CU, a first message; and receiving, by the first CU, a second message that includes configuration information, wherein the first message includes at least one of an identification of the IAB node, an identification of a user device in communication with the IAB node.

In another aspect, a wireless communication method is disclosed. The wireless communication method includes receiving, from a first central unit (CU) configured to communicate with an integrated access and backhaul (IAB) node, a first message; and sending, by the second CU, to the first CU, a second message that includes the configuration information.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

These, and other features, are described in the present document.

DETAILED DESCRIPTION

The disclosed technology provides implementations and examples of signaling exchange schemes in wireless communications. Some implementations of the disclosed technology provide signaling interaction between donors and IAB nodes when IAB nodes perform dual connections.

Figure 1:
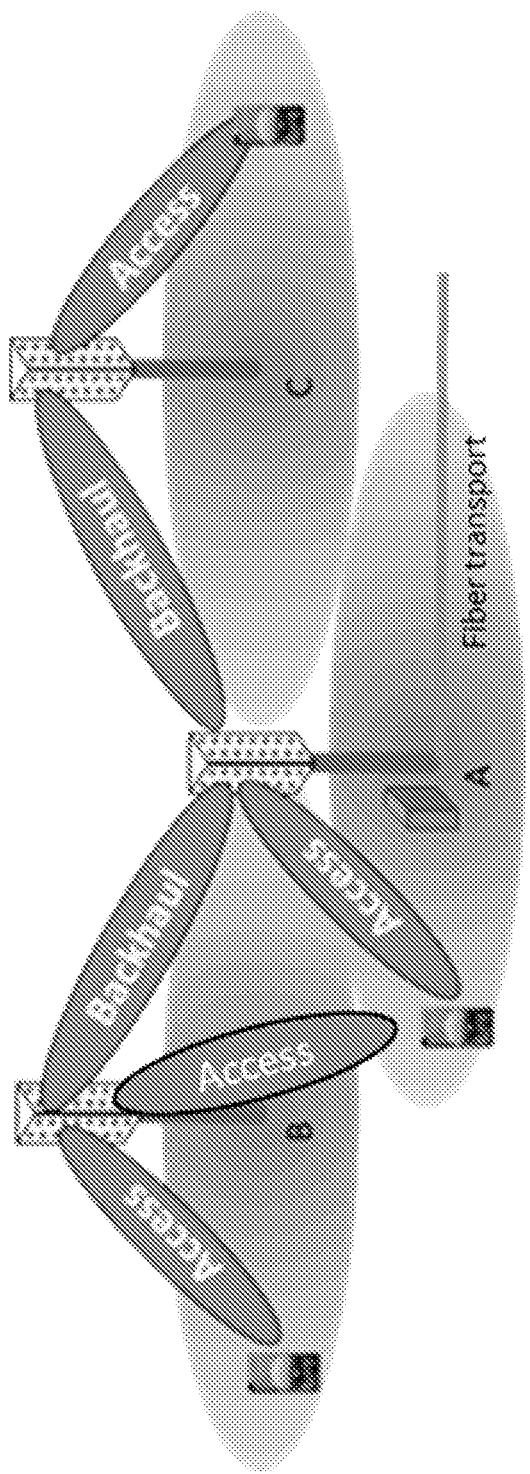
FIG. 1 shows an example of a network deployed with integrated access and backhaul links.

Compared with LTE, NR has a larger available bandwidth, and the use of massive MIMO and multi-beam makes it possible to research and apply integrated access and backhaul links (IAB). Through wireless backhaul links and relay links, dense NR cell networks can be deployed more flexibly without correspondingly increasing the dense deployment of transmission networks. An example of a network deployed with integrated access and backhaul links is shown in FIG. 1. In FIGS. 1, A, B, and C are all access nodes, and user equipment can access the access nodes A, B, C through the access link. There is only a wired connection between the access node A and the core network, and the access nodes B and C have no wired connection with the core network element. The access node that supports the wireless access of the UE and transmits data wirelessly is called an IAB node (IAB node).

The access node that provides the wireless backhaul function for the IAB node so that the UE connects to the core network is called an IAB donor (IAB donor). The data of the UE can be transmitted between the access nodes through the wireless backhaul link. For example, the access node B may send the data received from the UE to the access node A through a wireless backhaul link, and then the access node A sends the UE data to the core network element. For the downlink, the core network element can send the UE data packet to the access node A, and then the access node A sends the UE data to the access node B through the wireless backhaul link, and the access node B sends the UE data to the UE through the access link. Access link and backhaul link can use the same or different carrier frequencies. In addition, the data of the UE may need to be transmitted through the multi-hop relay backhaul link between the access node and the core network. In addition, supporting the separate deployment of central unit (CU)/distributed unit (DU) is an important technical feature in NR, and thus it is necessary to support the IAB function in the separate deployment scenario of CU/DU. Topological redundancy has the goal to enable robust operation, e.g., in case of backhaul link blockage, and to balance load across backhaul links. Establishment and management of topological redundancy need to be considered for the IAB. Currently, topology redundancy study only focuses on intra-CU topological redundancy case. However, inter-CU redundancy is agreed to support in Release 17 IAB. Implementations of the disclosed technology are related to establishment and management of inter-CU topological redundancy.

Figure 2:
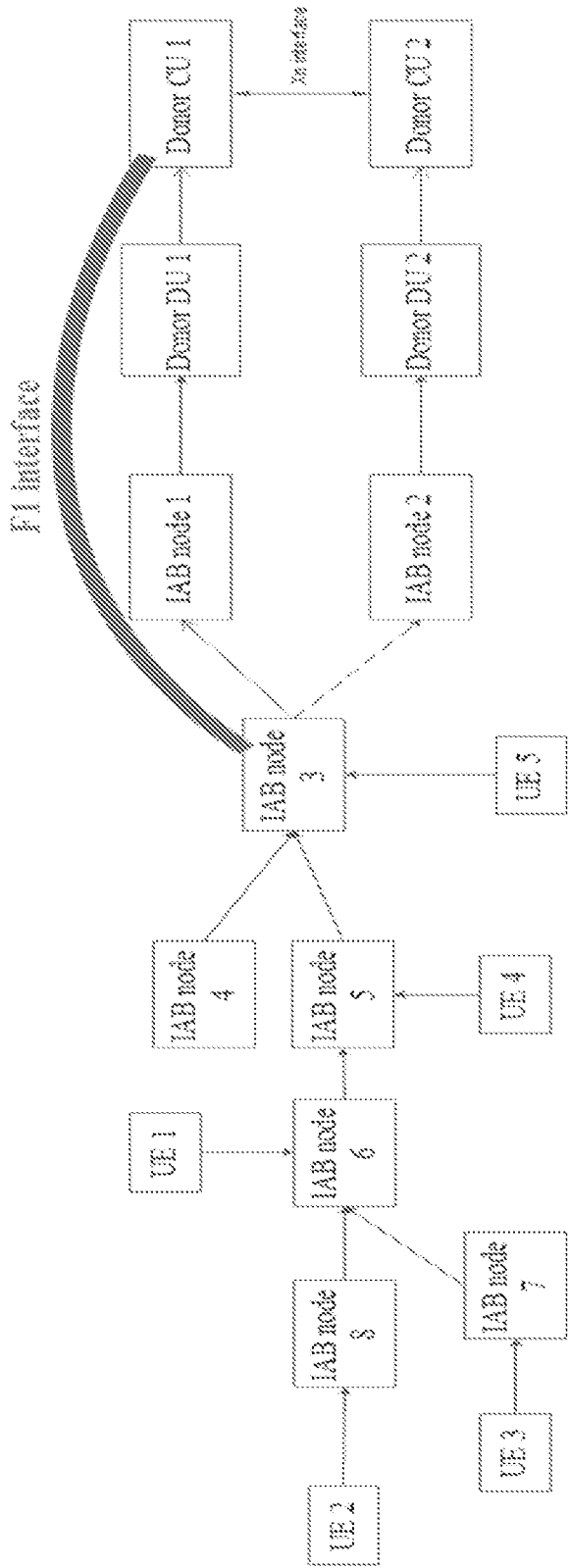
FIG. 2 shows an inter-central unit (CU) topology redundancy.

FIG. 2 shows an example of an inter-CU topology redundancy. The IAB node 3 is referred to as a dual-connecting IAB node, starts out with an MCG-link to the DU part of the IAB node 1 and adds an SCG-link to the DU part of the IAB node 2. In this example, the DU part of the IAB node 3 only establishes F1-C (control plane) with donor CU 1. The IAB node 4, the IAB node 5, the IAB node 6, the IAB node 7, and the IAB node 8 are descendant nodes of IAB node 3. The first path is established between the IAB node 3 and the donor CU 1, an additional path (which is referred to as a second path) is established between the IAB node 3 and donor CU 1 via the second-path. Since the donor-DU on the second path is different from the donor-DU on the first-path, new IP address anchored at the donor DU 2 would be allocated to the IAB node 3 and the downstream nodes.

Implementation 1

During a process for establishing the second path, since backhaul adaption protocol (BAP) address is CU unique, the BAP address of dual-connecting IAB node (e.g., the IAB node 3) and the BAP address of the upstream IAB node along the second path (e.g., IAB node 2) may be the same. As a result, the packet, which should have been sent to the dual-connecting IAB node 3, would be delivered to a upper layer by the upstream node. To solve this problem, orthogonal BAP address space can be allocated to different CUs by an operations administration and management (OAM) configuration. Optionally, CU ID and BAP address can be jointly used to identify an IAB-node, where the CU ID is the identifier of the donor CU. In this case, dual-connecting IAB node and downstream node may need to obtain CU identifiers of donor-CU 1 and donor-CU 2. The routing configuration, which is used by an IAB-node and a donor-DU for packet forwarding, needs to include CU ID. Upon receiving an DL packet, the IAB node determines whether to deliver the packet to the upper layer based on the CU ID and BAP address in the BAP header of the received packet. Alternatively, the IAB node uses a special field in a BAP header and the BAP address to determine whether the received packet needs to be delivered to the upper layer. Specifically, once the BAP address of received DL packet matches IAB-node's own, the IAB-node further reads the special field (e.g. 1 bit in a BAP header). For example, if the special field is set to "0", the IAB-node delivers the packet to upper layer. Otherwise, it forwards the packet to child node.

In the below, the procedures for establishing a redundant path in the IAB topology is described. In the descriptions below, the IAB node can correspond to the IAB node 3 or any one of descendant IAB nodes (IAB node 4 to IAB node 8 as shown in FIG. 2).

Step 1: The MT part of the IAB node (IAB-MT) sends a MeasurementReport message to the DU part of the first parent node. The IAB node may be the dual-connecting IAB-node. The MeasurementReport message is based on a measurement configuration that the IAB-MT previously received from the donor CU 1.

Step 2: The DU part of the first parent-node sends an uplink (UL) RRC message transfer message to the donor-CU 1 to convey the received MeasurementReport.

Step 3: The donor CU 1 sends a first Xn application protocol (XnAP) message to the donor CU 2. The first XnAP message may indicate following information:
1) identifier of the IAB node
2) UE identifier.

3) IAB node indication of the IAB node. The donor CU 2 can know whether the device supports IAB function based on the IAB node indication.

4) topology information, which reflects the topology relationship of the IAB node, any descendant nodes, and downstream UEs.

5) load status of the IAB node.

6) bearer mapping configuration and routing configuration of the IAB node.

7) bearer related information. Each bearer is associated with a UE, an IAB-MT or an IAB-DU. The bearer related information my include i) DRB related information that includes DRB ID and/or DRB QoS information, ii) QoS flows mapped to DRB, or iii) BH RLC channel information that includes BH RLC channel ID and/or QoS parameters related to BH RLC channels.

8) indication of types of non-UP traffic to be delivered via second-path for the IAB node.

9) BAP address for the IAB node.

10) IAB-DU configuration including STC information and/or resource configuration.

The XnAP message may include at least one of items 1) to 10) above.

The XnAP message can be a non-UE associated message or a UE-associated message. If it is a UE associated message, the donor CU 1 sends several messages to donor CU 2, where each message is associated with a IAB-MT or a UE.

The donor DU 2 and the donor DU 1 may be in the different subnets. In this case, the IAB node needs the IP addresses anchored at the donor DU 2, so that it can use the IP address to generate the UL IP packet to be routed via the second-path. The donor-CU 1 requests IP addresses from donor CU 2, and then sends the IP addresses to the IAB node.

In some implementations (regardless of which solution is adopted), the XnAP message may further include a separate IP address request for each usage for the IAB node, where the usages defined are all traffic, F1-U, F1-C and non-F1. Each usage of IP address request includes the number of requested IP address(es), the type of requested IP address (es), e.g. IPv4, IPv6/IPv6 prefix.

Step 4: The donor CU 2 sends a F1AP messages to the donor DU 2 and IAB node(s) along the second path to confirm the admitted bearers and BH RLC channels. For example, in FIG. 2, the IAB node 2 corresponds to the IAB node along the second path. Then, the donor CU 2 responses to the donor CU 1 with a second XnAP message, which may include the admitted bearer information. Each bearer is associated with a UE, an IAB-MT or an IAB-DU. The bearer information can include at least one of i) DRB related information that includes DRB ID and/or DRB QoS information, ii) QoS flows mapped to DRB, or iii) BH RLC channel information that includes BH RLC channel ID and/or QoS parameters related to BH RLC channels.

In some implementations, the second XnAP message may optionally include: (1) UL BH configuration of the GTP tunnel, which includes BAP routing ID, optionally next-hop BAP address and egress BH RLC CH ID, and/or (2) UL BH information of non-UP traffic, which includes BAP routing ID, optionally next-hop BAP address and egress BH RLC CH ID.

In some implementations, the second XnAP message may optionally include information that is related to the donor DU 2 and IAB nodes that are served by donor CU 2 and corresponding to the upstream node of the IAB node. Such information includes topology-related information, an identifier of donor-DU 2, identifiers of IAB-nodes, BAP address, load status, bearer mapping and routing configuration.

The second XnAP message may optionally include IAB-DU configuration, which includes STC information and/or resource configuration. The donor DU 2 configuration, which includes STC information and/or resource configuration, may be optionally sent to donor CU 1. The IAB-DU (e.g., the DU part of the IAB node 2 in FIG. 2) belongs to the IAB node that is served by the donor CU 2 and is the upstream node of the IAB node 3.

In some implementations, the second XnAP message can be a non-UE associated message or a UE-associated message.

If the donor CU 1 requests the donor CU 2 to allocate one or more IP addresses, the donor CU 2 may initiate the IAB TNL address allocation procedure to obtain IP addresses from the donor DU 2. The donor CU 2 sends the IP addresses allocated for each usage for the IAB node to the donor CU 1 via the second XnAP message. The donor DU 2 IP address(es) can be included in the message as well.

If the donor CU 2 determines to setup SRB3 for the IAB node, it would provide the SRB3 configuration for the IAB node to the donor CU 1 via a second XnAP message.

Step 5: The donor CU 1 sends a DL RRC message transfer message to the first parent IAB node (e.g., the IAB node 1 in FIG. 2, which is the first parent node of the IAB node 3), which includes a generated RRCReconfiguration message.

Step 6: The first parent IAB node forwards the received RRCReconfiguration message to the MT of the IAB node 3.

Step 7: The MT of the IAB node responds an RRCReconfigurationComplete message.

The RRCReconfiguration message may contain one or more TNL address(es) for the IAB-DU, which are anchored at the donor DU 2. The message may further include IP address(es) for the donor DU2. Thus, the IAB node can deduce the anchor of the received IP addresses.

If donor-CU 1 does not request IP address from donor 2, the IAB-node can request IP address by sending IABOtherInformation message. After receiving the IABOtherInformation message, the donor-CU 1 requests IP address from the donor 2, or forwards the IABOtherInformation message to donor-CU 2. The message can be sent after step 9.

Step 8: The DU part of the first parent IAB node sends an UL RRC message transfer message to the donor CU 1, to convey the received RRCReconfigurationComplete message.

If the MT part of the IAB node 3 sets up RRC connection with donor CU 2, the RRCReconfigurationComplete message includes an SN RRC response message for the donor CU 2, if needed. The donor CU 1 informs the donor CU 2 that the IAB-MT has completed the reconfiguration procedure successfully via SN Reconfiguration Complete message, including the SN RRC response message, if received from the IAB-MT.

Step 9: A random access procedure is performed at the DU part of the IAB node 2.

Step 10: The donor CU 2 sends the BH RLC channels and BAP-layer route entries configuration for the IAB node along the second path (e.g. IAB-node 2) and the donor DU 2. These configurations may be performed at an earlier stage, e.g. immediately after step 4.

Step 11: The new TNL addresses are added to the dual-connecting IAB-DU's F1-C association(s) with the donor CU1. The donor CU 1 may configure new UL BH information on the second path for F1AP messages.

Step 12: The donor CU 1 may migrate the F1-U tunnels it has with the dual-connecting IAB-DU from the first path to the second path via the UE CONTEXT MODIFICATION REQUEST message.

Step 13: The DU part of the dual-connectivity IAB node replies with a UE context modification response message.

Steps 12 and 13 can be performed for a subset of UE bearers, e.g., to balance the load between the first and the second path.

Implementation 2

In this embodiment, the BAP address collision is solved by negotiation between the donor CU 1 and the donor CU 2. In the below, the procedures for establishing a redundant path in the IAB topology is described. In the descriptions below, the IAB node can correspond to the IAB node 3 or any one of descendant IAB nodes (IAB node 4 to IAB node 8 as shown in FIG. 2).

Step 1: The MT part of the IAB node (IAB-MT) sends a MeasurementReport message to the DU part of the first parent node. The IAB node may be the dual-connecting IAB-node. The MeasurementReport message is based on a measurement configuration that the IAB-MT previously received from the donor-CU 1.

Step 2: The DU part of the first parent node sends an uplink (UL) RRC message transfer message to the donor-CU 1 to convey the received MeasurementReport.

Step 3: The donor CU 1 sends a first Xn application protocol (XnAP) message to the donor CU 2. The first XnAP message may indicate following information:

1) identifier of the IAB node
2) UE identifier.
3) IAB node indication of the IAB node. The donor CU 2 can know whether the device supports IAB function based on the IAB node indication.
4) topology information, which reflects the topology relationship of the IAB node, any descendant nodes, and downstream UEs.
5) load status of the IAB node.
6) bearer mapping configuration and routing configuration of the IAB node.
7) bearer related information. Each bearer is associated with a UE, an IAB-MT or an IAB-DU. The bearer related information my include i) DRB related information that includes DRB ID and/or DRB QoS information, ii) QoS flows mapped to DRB, or iii) BH RLC channel information that includes BH RLC channel ID and/or QoS parameters related to BH RLC channels.
8) indication of types of non-UP traffic to be delivered via second path for the IAB node.
9) BAP address for the IAB node.
10) IAB-DU configuration including STC information and/or resource configuration.

The XnAP message may include at least one of items 1) to 10) above.

The XnAP message can be a non-UE associated message or a UE-associated message. If it is a UE associated message, the donor CU 1 sends several messages to donor CU 2, where each message is associated with a IAB-MT or a UE.

The donor DU 2 and the donor DU 1 may be in the different subnets. In this case, the IAB node needs the IP addresses anchored at the donor DU 2 so that it can use the IP address to generate the UL IP packet to be routed via the second-path. The donor-CU 1 requests IP addresses from donor CU 2 directly, and then sends the IP addresses to the IAB node.

In some implementations (regardless of which solution is adopted), the XnAP message may further include a separate IP address request for each usage for the IAB node, where the usages defined are all traffic, F1-U, F1-C and non-F1. Each usage of IP address request includes the number of requested IP address(es), the type of requested IP address (es), e.g. IPv4, IPv6/IPv6 prefix.

Step 4: The donor CU 2 sends a F1AP messages to the donor DU 2 and IAB node(s) along the second path to confirm the admitted bearers and BH RLC channels. For example, in FIG. 2, the IAB node 2 corresponds to the IAB node along the second path. Then, the donor CU2 responses to the donor CU 1 with a second XnAP message, which may include the admitted bearer information. Each bearer is associated with a UE, an IAB-MT or an IAB-DU. The bearer information can include at least one of i) DRB related information that includes DRB ID and/or DRB QoS information, ii) QoS flows mapped to DRB, or iii) BH RLC channel information that includes BH RLC channel ID and/or QoS parameters related to BH RLC channels.

In some implementations, the second XnAP message may optionally include: (1) UL BH configuration of the GTP tunnel of the UE/IAB-MT, which includes BAP routing ID, optionally next-hop BAP address and egress BH RLC CH ID, and/or (2) UL BH information of non-up traffic for the IAB node, which includes BAP routing ID, optionally next-hop BAP address and egress BH RLC CH ID.

In some implementations, the second XnAP message may optionally include information that is related to the donor DU 2 and upstream IAB nodes that are served by donor CU 2 and corresponding to the upstream node of the IAB node. Such information includes topology-related information, BAP address, load status, bearer mapping and routing configuration.

In some implementations, the second XnAP message can be a non-UE associated message or a UE-associated message.

If a BAP address collision occurs, the donor CU 2 provides several candidate BAP addresses for the IAB node to the donor CU1 via a second XnAP message. Then the donor CU 1 chooses one BAP address ("BAP address 2") from the candidates and feedback the BAP address to the donor CU2 via a third XnAP message 3. The donor CU 2 stores the BAP address.

If the donor CU 1 requests the donor CU 2 to allocate one or more IP addresses, the donor CU 2 may initiate the IAB TNL address allocation procedure to obtain IP addresses from the donor DU 2. The donor CU 2 sends the IP addresses allocated for each usage for the IAB node to the donor CU 1 via the second XnAP message. The donor DU 2 IP address(es) can be included in the message as well.

If the donor CU 2 determines to setup SRB3 for the IAB node, it would provide the SRB3 configuration for the IAB node to the donor CU 1 via a second XnAP message.

Step 5: The donor CU 1 sends a DL RRC message transfer message to the first parent IAB node (e.g., the IAB node 1 in FIG. 2, which is the first parent node of the IAB node 3), which includes a generated RRCReconfiguration message.

Step 6: The first parent IAB node forwards the received RRCReconfiguration message to the MT of the IAB node 3.

Step 7: The MT of the IAB node responds an RRCReconfigurationComplete message.

The RRCReconfiguration message may contain one or more TNL address(es) for the IAB-DU, which are anchored at the donor DU 2. The message may further include IP address(es) for the donor DU2. Thus, the IAB node can deduce the anchor of the received IP addresses.

In some implementations, the RRCReconfiguration message may contain: BAP address allocated by the donor 2 (donor 2 is composed of the donor CU 2 and the donor DU 2) and an indication that the BAP address is used for the second path. The IAB node stores the BAP address. Thus, the IAB node has two BAP addresses. The original one is used for first path, and the received one is used for second path.

In some implementations, the RRCReconfiguration message may contain: BAP address allocated by donor 2. The IAB node replaces the previous stored BAP address with the received one. In this case, the donor CU 1 needs to update routing configuration for the donor DU 1 and IAB nodes along the first path.

Step 8: The DU part of the first parent IAB node sends an UL RRC message transfer message to the donor CU 1, to convey the received RRCReconfigurationComplete message.

If the MT part of the IAB node 3 sets up RRC connection with donor CU 2, the RRCReconfigurationComplete message includes an SN RRC response message for the donor CU 2, if needed. The donor CU 1 informs the donor CU 2 that the IAB-MT has completed the reconfiguration procedure successfully via SN Reconfiguration Complete message, including the SN RRC response message, if received from the IAB-MT.

Step 9: A random access procedure is performed at the DU part of the IAB node 2.

Step 10: The donor CU 2 sends the BH RLC channels and BAP-layer route entries configured for the IAB node along the second path (e.g., IAB node 2) and the donor DU 2. These configurations may be performed at an earlier stage, e.g. immediately after step 4.

Step 11: The new TNL addresses are added to the dual-connecting IAB-DU's F1-C association(s) with the donor CU 1. The donor CU 1 may configure new UL BH information on the second path for F1AP messages.

Step 12: The donor-CU 1 may migrate the F1-U tunnels it has with the dual-connecting IAB-DU from the first path to the second path via the UE CONTEXT MODIFICATION REQUEST message.

Step 13: The DU part of the dual-connectivity IAB node replies with a UE context modification response message.

Steps 12 and 13 can be performed for a subset of UE bearers, e.g., to balance the load between the first and the second path.

Implementation 3

This embodiment will discuss the BH configuration for the donor-DU 2 and the related IAB-nodes in the redundancy topology, where the BH configuration includes BH RLC channels configuration, routing configuration, and BH RLC channel mappings.

For a BAP SDU received from upper layers at the donor DU 2, the BAP entity performs mapping to an egress BH RLC channel based on downlink traffic to BH RLC channel mapping configuration. Each entry of the downlink traffic to BH RLC channel mapping configuration contains following:
1) a destination IP address, which is indicated by Destination IAB TNL Address IE in IP header information IE including an IPv4 address or IPv6 address or an IPv6 address prefix,
2) an IPv6 flow label, if configured, which is indicated by IPv6 Flow Label IE in IP header information IE,
3) a DSCP, if configured, which is indicated by DSCP IE in DS Information List IE in IP header information IE,
4) an egress link ID, which is indicated by Next-Hop BAP Address IE in BH Information IE, or by the Configured BAP address IE in UE-associated F1AP message, and 5) an egress BH RLC channel ID, which is indicated by Egress BH RLC CH ID IE in BH Information IE, or by the BH RLC CH ID IE in UE-associated F1AP message.

The donor-CU 1 may migrate the F1-U tunnels it has with the dual-connecting IAB-DU from the first path to the second path. For the IP packets transmitted in the F1-U tunnels, the donor DU 2 needs to know the downlink traffic to BH RLC channel mapping configuration for them. Otherwise, the donor DU 2 cannot determine which egress link or egress BH RLC channel the IP packets need to be delivered to. Regarding how to configure the DL mapping for the donor DU 2, following options can be considered.

Option 1: The donor CU 1 provides IPv6 flow label and/or DSCP for the F1-U tunnels to the donor CU 2 via XnAP message. The donor CU 2 generates the DL mapping configuration, and sends it to the donor DU 2. In this case, the donor CU 2 determines and sends BH configuration to the IAB-nodes on the second path between dual-connecting IAB node and second-path IAB-donor-DU. The donor CU 2 determines the BH configuration for the dual-connecting IAB node and descendant IAB nodes, and sends the configuration together with the IAB-node identifier to donor CU 1 via XnAP message. Then, the donor CU 1 forwards the BH configuration to the descendant nodes via F1AP messages.

Option 2: The donor CU 2 determines the DL mapping configuration and sends it to the donor DU 2. The donor CU2 also sends the IPv6 flow label and/or DSCP (optionally, IP address) for the F1-U tunnels to donor-CU 1. The donor CU 1 may use it to set DSCP and/or flow label fields for the downlink IP packets which are transmitted from the donor CU 1 to the donor CU 2. In this case, the donor CU 2 determines and sends BH configuration to the IAB-nodes on the second path between dual-connecting IAB node and second-path IAB-donor-DU. The donor CU 2 determines the BH configuration for the dual-connecting IAB node and descendant IAB nodes, and sends the configuration together with the IAB-node identifier to donor CU 1 via XnAP message. Then, the donor CU 1 forwards the BH configuration to the descendant nodes via F1AP messages.

Option 3: The donor CU 1 determines the DL mapping configuration and sends it to donor CU 2 via the XnAP message, including the identifier of donor-DU 2. Then, the donor CU 2 forwards the configuration to donor DU 2 via F1AP message. In this case, the donor CU 1 determines the BH configuration for the IAB-nodes on the second path between the dual-connecting IAB node and the second path IAB-donor-DU. Then the donor CU 1 sends these configuration together with the IAB-node identifier to donor CU 2 via the XnAP message. The donor CU 2 forwards the BH configuration to the IAB nodes along the second path. The donor CU 1 configures the BH RLC channels, routing, and BH RLC channel mappings to the descendant IAB nodes.

Implementation 4

If donor DU 2 has difficulties in sending/receiving IP packets to/from the donor CU 1 directly, the packet needs to be forwarded by the donor CU 2. This embodiment describes how to forward the packet by the donor CU 2.

Firstly, the donor DU 2 needs to distinguish the packet to be decapsulated by the donor CU 2 from the packet to be forwarded by donor CU 2. The following solutions can be considered.

Solution 1: Introduce a special field in a BAP header. The special field informs the donor DU to which layer the BAP SDU needs to be delivered to, e.g. IP layer or F1AP layer.

Solution 2: Donor-CU 1 configures the donor-DU with a list. The list includes the BAP addresses. After receiving an UL packet, the donor DU reads the BAP header and obtains the BAP address, then it decides to which layer the BAP SDU needs to be delivered, e.g. IP layer or F1AP layer, based on the list. For example, if the BAP address is in the list, the donor-DU delivers the BAP SDU to F1AP layer.

In the following, it is discussed how UL/DL packet is forwarded by the donor CU 2.

Upon receiving a UL packet from a child node, the donor DU 2 decides whether to deliver the packet to F1AP layer according the BAP address or the configuration. If yes, it encapsulates the IP packet into F1AP message, e.g. in a container, and sends the F1AP message to the donor 2 CU-CP. Donor 2 CU-CP extracts the IP packet from the container and then forwards the IP packet to donor-CU 1 via an IP routing. Alternatively, the donor 2 CU-CP can encapsulate the IP packet in XnAP message, and sends the XnAP message to the donor CU 1.

Upon sending an DL IP packet, the donor CU 1 can send it to donor 2 CU-CP via an IP routing, or encapsulate the IP packet into the XnAP message. After receiving an IP packet from the donor CU 1, the donor 2 CU-CP encapsulates IP packet into F1AP message, and sends it to donor DU 2. The Donor DU 2 decapsulates the F1AP message and obtains the IP packet. The donor DU 2 delivers the packet to corresponding BH RLC channel based on the mapping configuration.

Donors can exchange whether to support direct packet transmission between a donor CU and a donor DU belonging to another donor via the Xn interface.

Implementation 5

Suppose a new IAB-node connects to dual-connecting IAB-node or any of downstream node. After receiving the RRC setup request message for the newly accessed IAB node, the donor CU 1 can forwards the RRC setup request message to the donor CU 2 to request donor-CU 2 to setup RRC connection with the new accessed IAB-node. If the donor CU 2 admits the access of the IAB node, it will send an RRCSetup message to the donor CU 1. Then, the donor-CU 1 forwards the RRCSetup message to the newly accessed IAB node.

Figure 3:
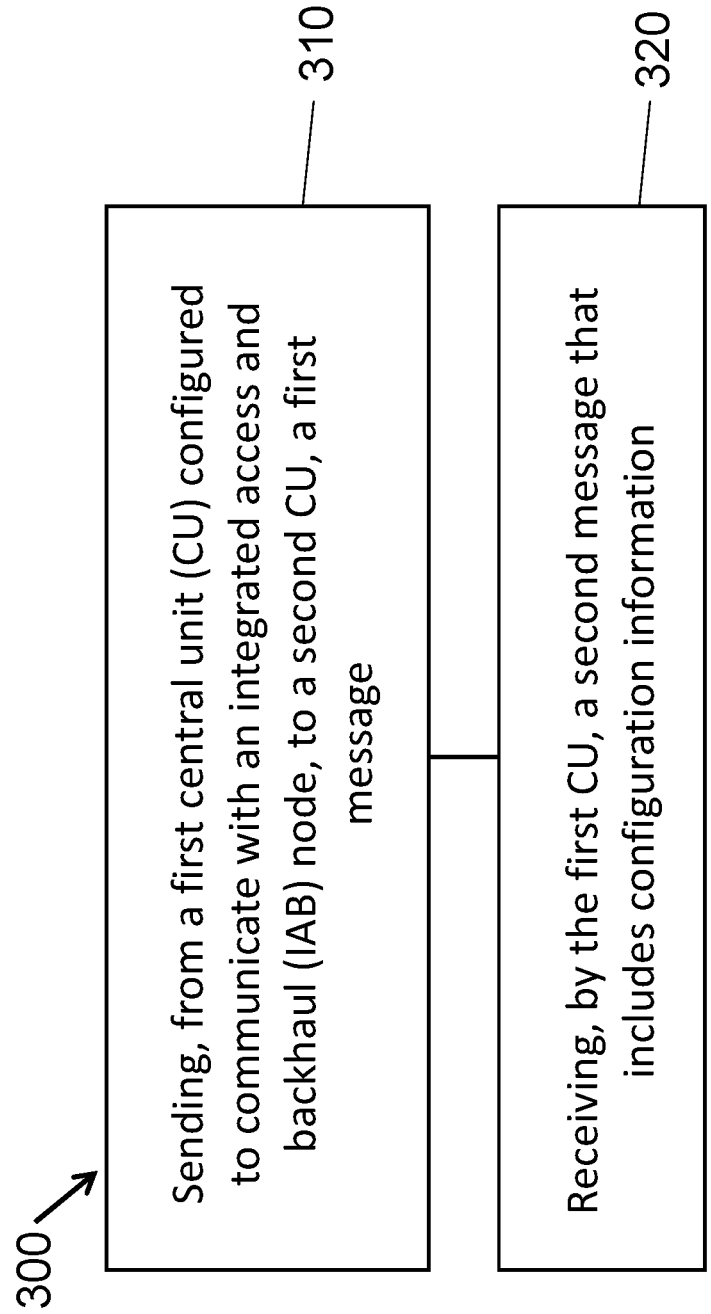
FIG. 3 shows an example of a method for wireless communication based on some implementations of the disclosed technology.

The implementations and examples of the wireless communication method disclosed above can facilitate handover procedures in multimedia broadcast multicast services. FIG. 3 shows an example of a wireless communication method. The method 300 includes, at the operation 310, sending, from a first central unit (CU) configured to communicate with an integrated access and backhaul (IAB) node, to a second CU, a first message. The method 300 further includes, at the operation 320, receiving, by the first CU, a second message that includes configuration information.

Figure 4:
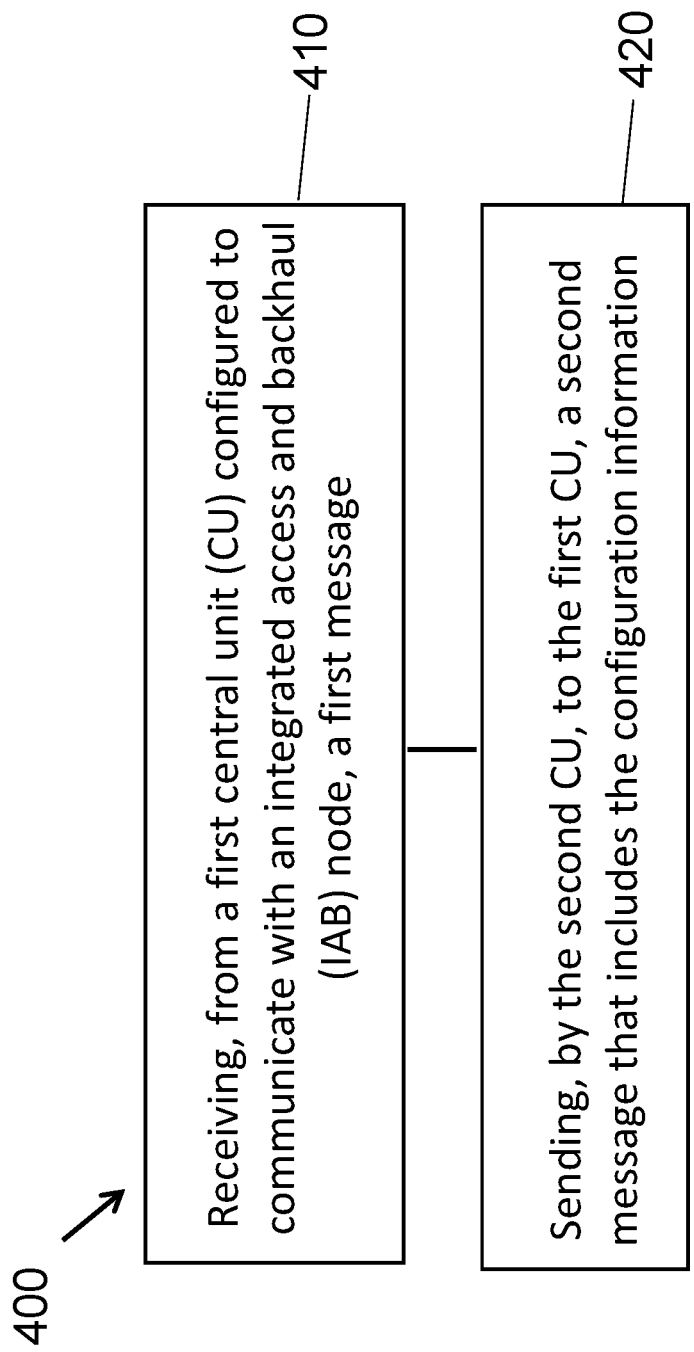
FIG. 4 shows an example of a method for wireless communication based on some implementations of the disclosed technology.

FIG. 4 shows another example of a wireless communication method. The method 400 includes, at the operation 410, receiving, from a first central unit (CU) configured to communicate with an integrated access and backhaul (IAB) node, a first message. The method 400 further includes, at the operation 420, sending, by the second CU, to the first CU, a second message that includes the bearer information.

Figure 5:
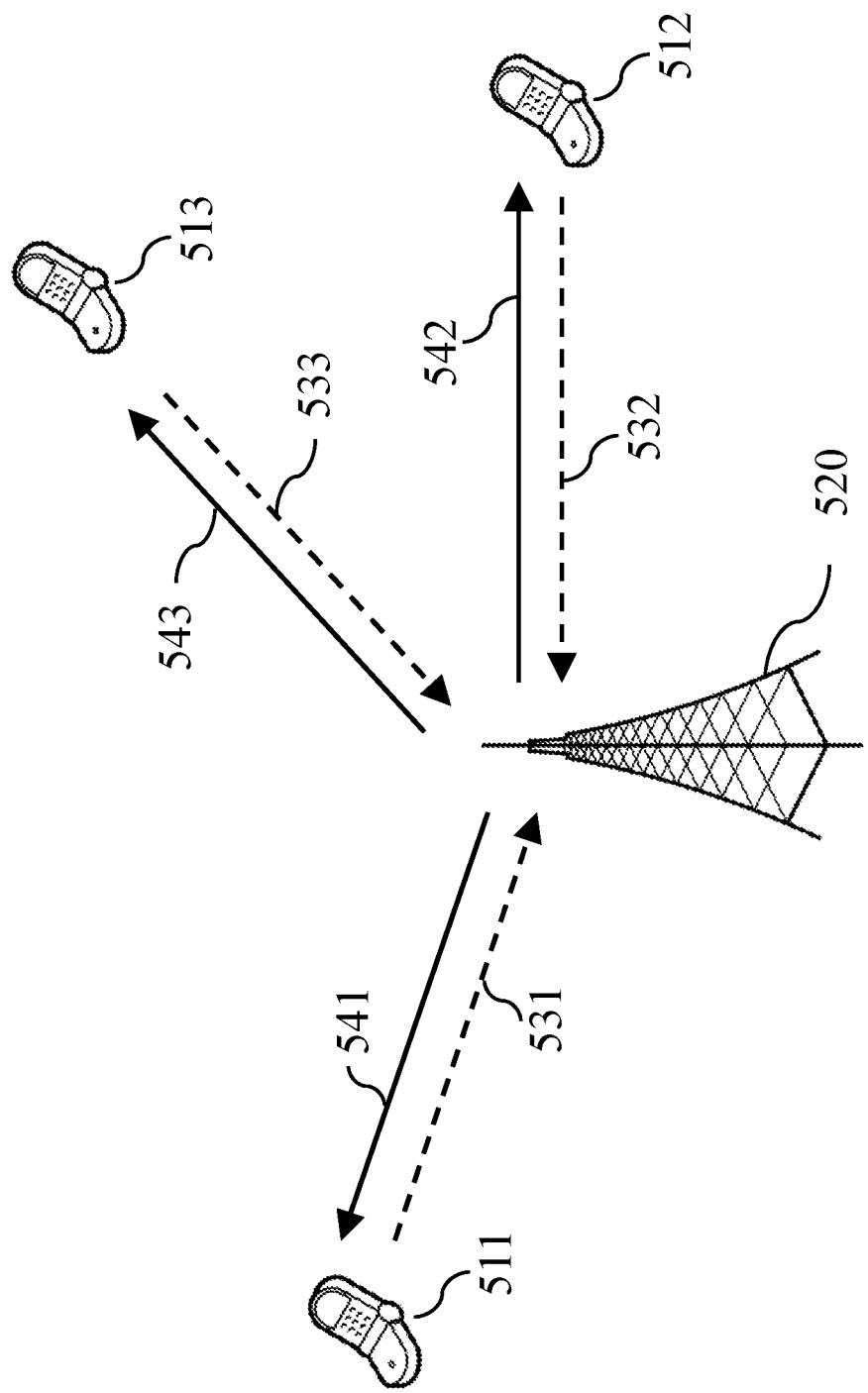
FIG. 5 shows an example of wireless communication including a base station (BS) and user equipment (UE) based on some implementations of the disclosed technology.

The implementations as discussed above will apply to a wireless communication. FIG. 5 shows an example of a wireless communication system (e.g., a 5G or NR cellular network) that includes a BS 520 and one or more user equipment (UE) 511, 512 and 513. In some embodiments, the UEs access the BS (e.g., the network) using implementations of the disclosed technology 531, 532, 533), which then enables subsequent communication (541, 542, 543) from the BS to the UEs. The UE may be, for example, a smartphone, a tablet, a mobile computer, a machine to machine (M2M) device, an Internet of Things (IoT) device, and so on.

Figure 6:
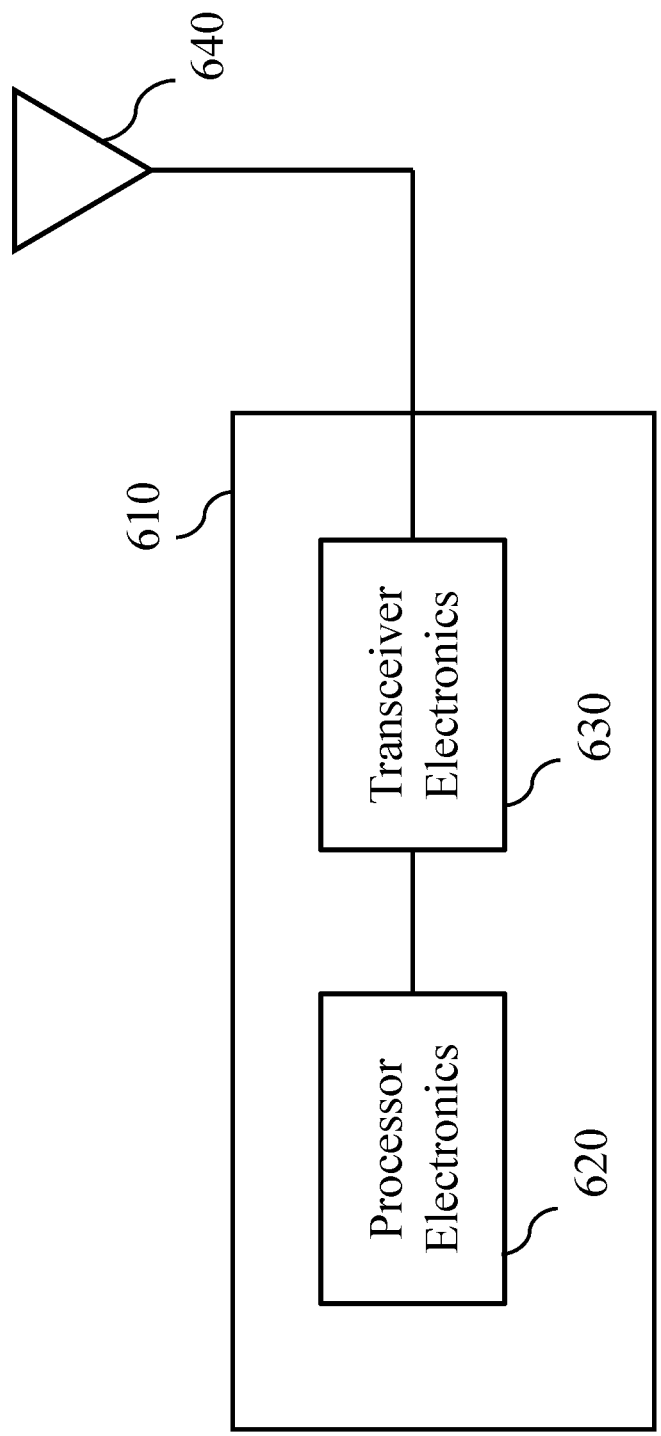
FIG. 6 shows an example of a block diagram of a portion of an apparatus based on some implementations of the disclosed technology.

FIG. 6 shows an example of a block diagram representation of a portion of an apparatus. An apparatus 610 such as a base station or a user device which may be any wireless device (or UE) can include processor electronics 620 such as a microprocessor that implements one or more of the techniques presented in this document. The apparatus 610 can include transceiver electronics 630 to send and/or receive wireless signals over one or more communication interfaces such as antenna 640. The apparatus 610 can include other communication interfaces for transmitting and receiving data. The apparatus 610 can include one or more memories (not explicitly shown) configured to store information such as data and/or instructions. In some implementations, the processor electronics 620 can include at least a portion of transceiver electronics 630. In some embodiments, at least some of the disclosed techniques, modules or functions are implemented using the apparatus 610.

Additional features of the above-described methods/techniques that may be preferably implemented in some implementations are described below using a clause-based description format.

1. A method of wireless communication, comprising: sending, from a first central unit (CU) configured to communicate with an integrated access and backhaul (IAB) node, to a second CU, a first message; and receiving, by the first CU, a second message that includes configuration information, and wherein the first message includes at least one of an identification of the IAB node, an identification of a user device in communication with the IAB node.

2. The method of clause 1, wherein the first CU and the second CU correspond to donor CUs.

3. The method of clause 1, wherein the first message further includes at least one of i) an IAB node indication of the IAB node and ii) topology relationship among the IAB node, descendant nodes, and the user devices in communication with the IAB-node and the descendant nodes.

4. The method of clause 1, wherein the first message further includes at least one of i) a load status of the IAB node, ii) bearer mapping configuration and routing configuration of the IAB node, iii) bearer information, iv) an indication of a type of control plane traffic delivered via a second communication path, v) a backhaul adaptation protocol (BAP) address of the IAB node, vi) configuration information for a DU (distributed unit) part of the IAB node.

5. The method of clause 1, further comprising sending an IP address request for one or more IP addresses.

6. The method of clause 1, wherein the second message includes bearer information associated with the user device and/or the IAB node.

7. The method of clause 4 or 6, wherein the bearer information includes at least one of i) data radio bearer (DRB) related information including at least one of DRB identification (ID) and DRB quality of services (QoS) information, ii) a QoS flow mapped to the DRB, or iii) backhaul (BH) radio link control (RLC) channel information and BH RLC channel QoS information.

8. The method of clause 6, wherein the second message further includes at least one of i) an uplink (UL) backhaul (BH) configuration of a GTP (GPRS tunneling protocol) tunnel, or ii) an uplink BH information of a type of non-UP traffic for the IAB node.

9. The method of clause 6, wherein the second message further includes at least one of topology-related information, an identifier of a distribution unit of the second CU, an identifier of an IAB-node served by the second CU on the second communication path, a BAP address, a load status, a bearer mapping and routing configuration, or configuration information for a distribution unit of the IAB node.

10. The method of clause 1, further comprising: sending, to the IAB node served by the first CU, a reconfiguration message that includes information related to an radio resource control (RRC) connection.

11. The method of clause 10, wherein the reconfiguration message including at least one of i) one or more transport network layer (TNL) addresses for the IAB node, ii) a BAP address, or iii) an indication that the BAP address is used for the second communication path.

12. The method of clause 1, further comprising: receiving, from the second CU, candidate BAP addresses for the IAB node.

13. The method of clause 1, further comprising: sending, to the second CU, information that includes at least one of i) a flow label or ii) a differentiated services code point (DSCP) for a F1-U tunnel or a type of control plane traffic.

14. The method of clause 1, further comprising: receiving, from the second CU, at least one of i) a flow label or ii) a differentiated services code point (DSCP) for a F1-U tunnel or a type of control plane traffic.

15. The method of clause 1, further comprising: sending, to the second CU, an identifier of a distribution unit of the second CU, and DL mapping configuration.

16. The method of clause 1, further comprising: sending, to the second CU, an identifier of an IAB-node served by the second CU on the second communication path and BH configuration.

17. The method of clause 15 or 16, the DL mapping configuration and BH config can be at least one of BH RLC channels configuration, routing configuration, or BH RLC channel mappings.

18. The method of clause 1, further comprising: sending a packet by including an CU ID and a BAP address in a header of the packet, the CU ID corresponding to an identifier of the first CU or the second CU.

19. A method of wireless communication, comprising: receiving, from a first central unit (CU) configured to communicate with an integrated access and backhaul (IAB) node, a first message; and sending, by the second CU, to the first CU, a second message that includes the configuration information.

20. The method of clause 19, wherein the first CU and the second CU correspond to donor CUs.

21. The method of clause 19, wherein the second message further includes at least one of i) an uplink (UL) backhaul (BH) configuration of a GTP tunnel, ii) an uplink BH information of a type of non-UP traffic for the IAB node.

22. The method of clause 19, wherein the second message further includes one or more IP addresses for the IAB node.

23. The method of clause 19, wherein the second message further includes candidate BAP addresses for the IAB node.

24. The method of clause 19, further comprising: receiving, from the first CU, at least one of i) a flow label, ii) a differentiated services code point (DSCP) for a F1-U tunnel or a type of control plane traffic.

25. The method of clause 19, further comprising: sending, to the first CU, at least one of i) a flow label or ii) a differentiated services code point (DSCP) for a F1-U tunnel or a type of control plane traffic.

26. The method of clause 19, further comprising: sending, to the first CU, an identifier of the IAB-node and BH configuration, the IAB-node having a dual connectivity.

27. The method of clause 19, further comprising: sending, to the first CU, an identifier of a downstream IAB-node and BH configuration. The downstream node is the node which is located along the direction from the IAB doner to a user device.

28. The method of clause 26, or 27, wherein the BH configuration includes at least one of BH RLC channels configuration, routing configuration, or BH RLC channel mappings.

29. A communication apparatus comprising a processor configured to implement a method recited in any one or more of clauses 1 to 28.

30. A computer readable medium having code stored thereon, the code, when executed, causing a processor to implement a method recited in any one or more of clauses 1 to 28.

In some embodiments, a base station may be configured to implement some or all of the base station side techniques described in the present document.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
    sending, by a first central unit (CU) configured to communicate with an integrated access and backhaul (IAB) node through a first path, to a second CU configured to communicate with the IAB node through a second path different from the first path, a first message including a backhaul adaptation protocol (BAP) address of the IAB node;
    receiving, by the first CU, from the second CU, a second message that includes bearer information associated with a user device and the IAB node, the second message further including candidate backhaul adaption protocol (BAP) addresses for the IAB node upon an occurrence of a BAP address collision; and
    sending, by the first CU, to the second CU, a third message including a final BAP address selected from the candidate BAP addresses, and
    wherein the first message includes at least one of an identification of the IAB node, an identification of a user device in communication with the IAB node.

2. The method of claim 1, wherein the first CU and the second CU correspond to donor CUs, and wherein the first message further includes at least one of i) an IAB node indication of the IAB node and ii) topology relationship among the IAB node, descendant nodes, and the user devices in communication with the IAB node and the descendant nodes.

3. The method of claim 1, wherein the first message further includes at least one of i) a load status of the IAB node, ii) bearer mapping configuration and routing configuration of the IAB node, iii) an indication of a type of control plane traffic delivered via a second communication path, iv) configuration information for a DU (distributed unit) part of the IAB node.

4. The method of claim 1, further comprising sending an IP address request for one or more IP addresses.

5. The method of claim 1, wherein the bearer information includes at least one of i) data radio bearer (DRB) related information including at least one of DRB identification (ID) and DRB quality of services (QoS) information, ii) a QoS flow mapped to the DRB, or iii) backhaul (BH) radio link control (RLC) channel information and BH RLC channel QoS information.

6. The method of claim 1, wherein the second message further includes at least one of i) an uplink (UL) backhaul (BH) configuration of a GTP (GPRS tunneling protocol) tunnel, ii) an uplink BH information of a type of non-UP traffic for the IAB node, iii) topology-related information, iv) an identifier of a distribution unit of the second CU, v) an identifier of an IAB-node served by the second CU on a second communication path, vi) a load status, vii) a bearer mapping and routing configuration, or viii) configuration information for a distribution unit of the IAB node.

7. The method of claim 1, further comprising: sending, to the IAB node served by the first CU, a reconfiguration message that includes information related to an radio resource control (RRC) connection.

8. The method of claim 1, further comprising: sending, to the second CU, information that includes at least one of i) a flow label or ii) a differentiated services code point (DSCP) for a F1-U tunnel or a type of control plane traffic.

9. The method of claim 1, further comprising:
receiving, from the second CU, at least one of i) a flow label or ii) a differentiated services code point (DSCP) for a F1-U tunnel or a type of control plane traffic.

10. The method of claim 1, further comprising: sending, to the second CU, at least one of 1) an identifier of a distribution unit of the second CU, and DL mapping configuration, or 2) an identifier of an IAB-node served by the second CU on a second communication path and BH configuration, and
wherein, the DL mapping configuration and BH configuration include at least one of BH RLC channels configuration, routing configuration, or BH RLC channel mappings.

11. A method of wireless communication, comprising:
receiving, by a second CU configured to communicate with an integrated access and backhaul (IAB) node through a second path, from a first central unit (CU) configured to communicate with the integrated access and backhaul (IAB) node through a first path different from the second path, a first message including a backhaul adaptation protocol (BAP) address of the IAB node; and
sending, by the second CU, to the first CU, a second message that includes bearer information associated with a user device and the LAB node, the second message further including candidate backhaul adaption protocol (BAP) addresses for the IAB node upon an occurrence of a BAP address collision, and
receiving, by the second CU, from the first CU, a third message including a final BAP address selected from the candidate BAP addresses, and
wherein the first message includes at least one of an identification of the IAB node, an identification of a user device in communication with the IAB node.

12. The method of claim 11, wherein the first CU and the second CU correspond to donor CUs, and wherein the second message further includes at least one of i) an uplink (UL) backhaul (BH) configuration of a GTP tunnel, ii) an uplink BH information of a type of non-UP traffic for the IAB node.

13. The method of claim 11, further comprising: receiving, from the first CU, at least one of i) a flow label, ii) a differentiated services code point (DSCP) for a F1-U tunnel or a type of control plane traffic.

14. The method of claim 11, further comprising:
sending, to the first CU, at least one of i) a flow label or ii) a differentiated services code point (DSCP) for a F1-U tunnel or a type of control plane traffic.

15. The method of claim 11, further comprising:
sending, to the first CU, at least one of i) an identifier of the IAB node and BH configuration, the IAB node having a dual connectivity, or ii) an identifier of a downstream IAB node and BH configuration, wherein the BH configuration includes at least one of BH RLC channels configuration, routing configuration, or BH RLC channel mappings.

16. A communication apparatus comprising at least one processor configured to implement a method comprising:
sending, by the at least one processor operating as a first central unit (CU) included in the communication apparatus and configured to communicate with an integrated access and backhaul (IAB) node through a first path, to a second CU configured to communicate with the IAB node through a second path different from the first path, a first message including a backhaul adaptation protocol (BAP) address of the IAB node;
receiving, from the second CU, a second message that includes bearer information associated with a user device and the IAB node, the second message further including candidate backhaul adaption protocol (BAP) addresses for the IAB node upon an occurrence of a BAP address collision; and
sending, to the second CU, a third message including a final BAP address selected from the candidate BAP addresses, and
wherein the first message includes at least one of an identification of the IAB node, an identification of a user device in communication with the IAB node.

17. The communication apparatus of claim 16, wherein the method further comprises:
sending, to the second CU, information that includes at least one of i) a flow label or ii) a differentiated services code point (DSCP) for a F1-U tunnel or a type of control plane traffic.

18. The communication apparatus of claim 16, wherein the method further comprises:
sending, to the second CU, at least one of i) an identifier of a distribution unit of the second CU, and DL mapping configuration, or ii) an identifier of an IAB node served by the second CU on a second communication path and BH configuration, and
wherein, the DL mapping configuration and BH configuration include at least one of BH RLC channels configuration, routing configuration, or BH RLC channel mappings.

* * * * *

UNITED STATES PATENT AND TRADEMARK OFFICE
CERTIFICATE OF CORRECTION

| | | |
|---|---|---|
| PATENT NO. | : 12,426,113 B2 | Page 1 of 1 |
| APPLICATION NO. | : 18/169422 | |
| DATED | : September 23, 2025 | |
| INVENTOR(S) | : Xueying Diao et al. | |

It is certified that error appears in the above-identified patent and that said Letters Patent is hereby corrected as shown below:

In the Claims

In Column 15, Line 49, in Claim 11, delete "LAB" and insert --IAB--, therefor.

Signed and Sealed this
Twenty-fifth Day of November, 2025

John A. Squires
*Director of the United States Patent and Trademark Office*